(12) United States Patent
Ruetenik

(10) Patent No.: US 8,291,683 B2
(45) Date of Patent: Oct. 23, 2012

(54) EQUINE EXERCISE BOOT ASSEMBLY AND METHOD

(76) Inventor: Monty L. Ruetenik, Clear Lake Shores, TX (US)

(*) Notice: Subject to any disclaimer, the term of this patent is extended or adjusted under 35 U.S.C. 154(b) by 0 days.

(21) Appl. No.: 13/014,535

(22) Filed: Jan. 26, 2011

(65) Prior Publication Data

US 2011/0197554 A1     Aug. 18, 2011

Related U.S. Application Data

(60) Provisional application No. 61/304,425, filed on Feb. 13, 2010.

(51) Int. Cl.
*B68C 5/00*     (2006.01)
(52) U.S. Cl. ............................... 54/82; 168/2
(58) Field of Classification Search ........ 54/82; 119/850; 168/1, 2, 3, 18; 36/153
See application file for complete search history.

(56) References Cited

U.S. PATENT DOCUMENTS

| | | | |
|---|---|---|---|
| 840,892 A | | 1/1907 | Adam |
| 851,243 A | | 4/1907 | Manley |
| 4,744,422 A | | 5/1988 | Dallmer |
| 4,899,693 A | * | 2/1990 | Arnold .......................... 119/28.5 |
| 4,981,010 A | | 1/1991 | Orza et al. |
| 5,174,382 A | * | 12/1992 | Wright ............................ 168/28 |
| 5,244,549 A | | 7/1993 | Lighter |
| 5,363,632 A | * | 11/1994 | Armato ............................. 54/82 |
| 5,443,440 A | * | 8/1995 | Tumey et al. ................. 601/152 |
| 5,658,324 A | | 8/1997 | Bailey, et al. |
| 5,692,570 A | * | 12/1997 | Åkesson .......................... 168/28 |
| 6,238,427 B1 | | 5/2001 | Matta |
| 6,656,208 B2 | | 12/2003 | Grahn et al. |
| 6,868,656 B2 | | 3/2005 | Osha et al. |
| 7,178,321 B2 | | 2/2007 | Ruetenik |
| 7,445,051 B2 | | 11/2008 | Ruetenik |
| 2006/0016098 A1 | * | 1/2006 | Lu et al. ............................ 36/2.6 |
| 2007/0114045 A1 | * | 5/2007 | Morris et al. ................... 168/14 |
| 2008/0072453 A1 | * | 3/2008 | Mizrahi ............................ 36/44 |
| 2008/0190368 A1 | * | 8/2008 | Wase ......................... 119/14.18 |
| 2009/0032270 A1 | | 2/2009 | Ruetenik |
| 2010/0095641 A1 | | 4/2010 | Ruetenik |
| 2010/0223893 A1 | * | 9/2010 | D'Arpe ............................. 54/82 |
| 2011/0067366 A1 | * | 3/2011 | Ruetenik ........................... 54/82 |

OTHER PUBLICATIONS

Mansmann and von Orde: What Do Healthy Horse Feet Look Like and How Might We Figure That Out. Equine Podiatry & Rehab. Service, N. Carolina.
Ovincek; Optimizing Laminitis Treatment by Understanding the Morphology of the Affected Hoof.
Redden; Shoeing the Laminitic Horse; 1997@vol. 43, AAEP Proceedings, reprinted in the IVIS websie w/promission of AAEP.
Clog on Clog; Removable System for Laminitis; http:/hoofcare.blogspot.com/2008/07/clog-on-clog removable-for.html.
West, Wooden Shoes for Chronic Laminitis; The Horse.comApr. 23, 2008, Article #11718.
http://en.wikipedia.org/wiki/Horse_gait.

* cited by examiner

*Primary Examiner* — Rob Swiatek
*Assistant Examiner* — Lisa Tsang
(74) *Attorney, Agent, or Firm* — Douglas Baldwin (57) ABSTRACT

A boot assembly and method that simulates, in a static equine animal (stalled or hauled), the natural mechanical action of walking or other gaited exercise. The assembly has a boot, containing a shock absorbing pad that is fitted with a separate pulsing bladder disposed on, under or inside the shock absorbing pad. Pressuring and relaxing the pulsing bladder in the bottom of the boot rhythmically pushes against the sole and frog of the equine hoof in much the same way that the hoof is exercised when the animal is moving. The pulsing action helps stimulate blood flow through the hoof and is beneficial to shod, injured, and transported horses. The assembly may be fitted on one or more hooves, and may be automated to provide timing and sequencing to simulate different gaits of the animal.

20 Claims, 5 Drawing Sheets

EQUINE EXERCISE BOOT ASSEMBLY AND METHOD

RELATIONSHIP TO OTHER APPLICATIONS

This application claims benefit of Provisional Patent Application Ser. No. 61/304,425 filed Feb. 13, 2010.

FIELD OF THE INVENTION

This invention relates to an equine boot assembly and method that simulates the natural mechanical action of walking exercise in a static equine (as when stalled and/or transported). More specifically, it relates to a boot/pad assembly and method having a means to pulse or massage the underside of an equine hoof, thus, providing simulated natural mechanical exercise and increased blood flow through the hoof.

BACKGROUND

Walking causes natural compression and release of the sole of the equine hoof. As the hoof strikes the ground, the walls of the hoof expand slightly to allow the frog of the hoof to be compressed. When the hoof is raised, the frog returns to its resting position. This action on the frog of the hoof acts as a secondary blood pump to circulate blood to all parts of the hoof, as well as to other extremities. In many cases, post surgical walking is not only an equine's natural way of healing, but is essential for a horse's recovery and well being. It is often necessary to walk a horse several times a day for days to weeks after surgery. Such exercise can be both expensive and time consuming.

The importance of the hoof as a blood pump is not limited to injury and healing, however. Horses that are transported or stalled, especially in stalls with hard floor surfaces, suffer from lack of hoof and leg exercise. In many cases, owners will stop and exercise their horses as often as every four hours—greatly extending travel time and inconvenience. Although recovery needs be rapid in these hauled performance horses to restore natural circulation of blood to the extremities, and to return the horse to performance condition, horses transported long distances may need significant recovery time to regain peak performance. Unfortunately, attempts to achieve this rapid recovery commonly require the use of excessive medication, including pain killers and legal stimulants.

The present invention provides an equine boot assembly and method that simulates the natural mechanical action of walking and can mitigate costs and ill effects from stalling and transport.

SUMMARY OF THE INVENTION

It is not always convenient or possible to exercise equines by walking. Post-surgical walking is beneficial for proper blood flow to the extremities, but is time consuming and expensive. During extended transport, sufficient walking is frequently impossible. The present invention is a boot assembly and method to mechanically simulate the natural action of walking or other movement on the hooves and legs of equines. One advantage of one aspect of the present invention is its portability, as in one embodiment, the invention may be entirely carried on the horse.

In its broadest aspect, the invention is a portable equine boot assembly comprising a boot having disposed therein a pad which has a pressure pulsing means disposed thereon or therein. In one embodiment, the invention is a boot assembly wherein the boot has an upper section made from flexible material, shaped to conform to various equine hoof configurations and comprising a front, sides, and rear; a fastening means to fasten the front and rear of the upper section of the boot together around an equine leg; and an elastomeric bottom section into which the upper section is disposed. The assembly also includes a shock absorbing, pad having disposed therein or thereon a pressure pulsing means. The said pressure pulsing means is in turn connected to a pumping or injection means to pump fluid (e.g. any suitable gas, such as air, or any suitable liquid) into the pulsing means to inflate it, and to a pressure relief means to release the pressure and allow the pulsing means to deflate.

The system and method of the invention is a portable apparatus and method for simulating the movement of an equine, comprising placing at least one of the equine's hooves inside a boot assembly comprising a boot having a pad with a pressure pulsing means disposed therein or thereon and controlling the flow of fluid into the pulsing means to effect the expansion and deflation of the pulsing means. More detailed embodiments are detailed in the specification and in the claims. In one embodiment, the means of pressurizing and depressurizing the pressure pulsing means for multiple hooves is automated to simulate walking or other natural gaits of the animal.

DETAILED DESCRIPTION OF THE INVENTION

For horses, walking is more than mere exercise; it is also therapeutic. In walking or running, the frog of the hoof operates in concert with the rest of the hoof to act as a secondary blood pump to circulate blood to the extremities and return blood to the heart. For post surgical recovery, easing of the pain caused by laminitis, and fatigue prevention, this increased blood flow is very beneficial, if not necessary. However, it is not always possible or economical to walk (or perform some other means of exercise) a horse as much or as often as needed. Additionally, while walking is necessary for the general well-being of equines, it cannot be accomplished during hauling. The present invention is a boot assembly and method that simulates the natural mechanical actions and benefits of walking (or other gaits) in a stationary animal. The boot assembly comprises a flexible boot having disposed therein a pad, preferably an elastomeric (gel), which has means of expanding and contracting a portion in a pulsing action, providing a massaging action to the sole bottom and frog of the hoof. This action cyclically compresses and relieves the frog of the hoof in the same way as does walking or running. The means for expansion and contraction is, in one embodiment, a flexible bladder (bag) that may be expanded by pumping into it a pressurizing fluid (liquid or gas) and then releasing the pressure so the bag retracts to or substantially near its initial position—providing a cyclical pumping action. The bag may be disposed in the pad in a depression in the top of a pad, in which case the bag will be directly in contact with the underside of the hoof. Alternatively the bag may be disposed under an orthotic gel pad to raise and lower the pad or, in a depression in the underside of the pad, in which case the pad remains in contact with and supports the underside of the hoof as the center of the pad moves up and down. The pulsing means may also be molded into as an integral part of the pad, where it may be positioned in any segment of the orthotic pad, not necessarily the center, thus, allowing pulsing on the portion of the underside of the hoof where most desired (generally the frog). Rather than a separate container, a bag-like space (container) may be molded into the pad itself. The location and size of the molded pressure pulsing means may be varied to provide the most effective pulsing action, which will vary with the condition of the hoof and the desired effect. The desired size and location of the pulses may be controlled by the: 1) placement of the pulsing means in the orthotic pad, 2) hardness (or softness) of the pad material above and around the pulsing means and 3) depth of gel above and below the pulsing means in the orthotic.

In general, the volume of the pulsing bladder will be from about one hundred (100) to about five hundred (500) mL (6.10-30.51 cubic inches); therefore, the amount of fluid need not be great, and the pressure system can easily be battery powered and carried by the horse.

The pressure pulsing means will have at least one inlet port, and in some cases may have both inlet and outlet ports in order to attach conduit through which the pressurizing fluid passes. Generally, only one port is required but in some embodiments an inlet and outlet port will be used to circulate fluid, particularly cooling fluid through the pulsing bladder. When air or other gas is the pressurizing fluid chosen, the pulsing means (bladder) can be both pressurized and depressurized through a single port by venting, as through a three-way valve or as through a conduit fitted with a pressure relief valve or other pressure relief means.

Pressure levels in the pressure pulsing means need not be excessive—pressures from nearly zero to about two hundred seven (207) kPa (0+ to 30 psi) are effective in achieving the desired pulsing action, with pressures from about twenty-one (21) to one hundred thirty-eight (138) kPa (3-20 psi) being preferred. The optimum pressure required for any size and configuration can be easily testes as that needed to raise the hoof of a standing horse the desired amount, generally about 0.5 to 1.0 inches.

In one or more embodiments, the equine boot pad assembly of the present invention uses versions of an equine boot and orthotic pads described in U.S. Pat. No. 7,178,321, issued Feb. 20, 2007, U.S. Pat. No. 7,445,051, issued Nov. 4, 2008, D565256, issued Mar. 25, 2008, and U.S. patent application Ser. No. 12/284,925 filed Sep. 24, 2008, all of which appropriate portions are incorporated herein by reference.

The Preferred Boot/Pad Assembly

The basic features of the boot and shock absorbing pad useful in the assembly of this invention are summarized below.

Figure 2:
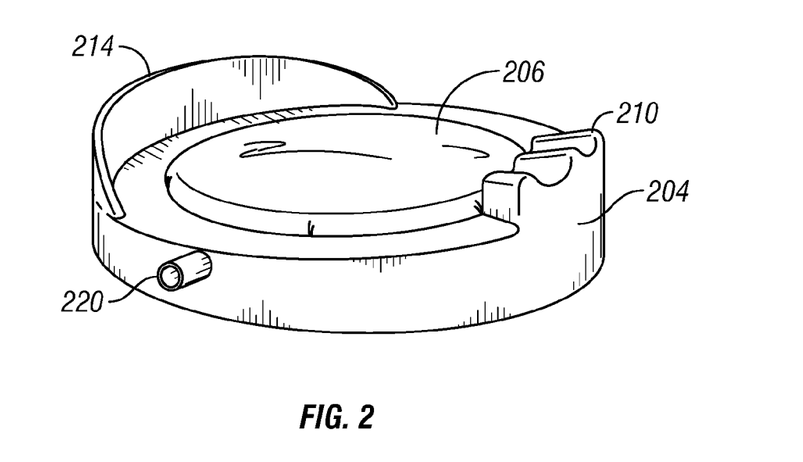
FIG. 2 is another isometric view of a pad and pressure bag of an embodiment of the invention.
Figure 3:
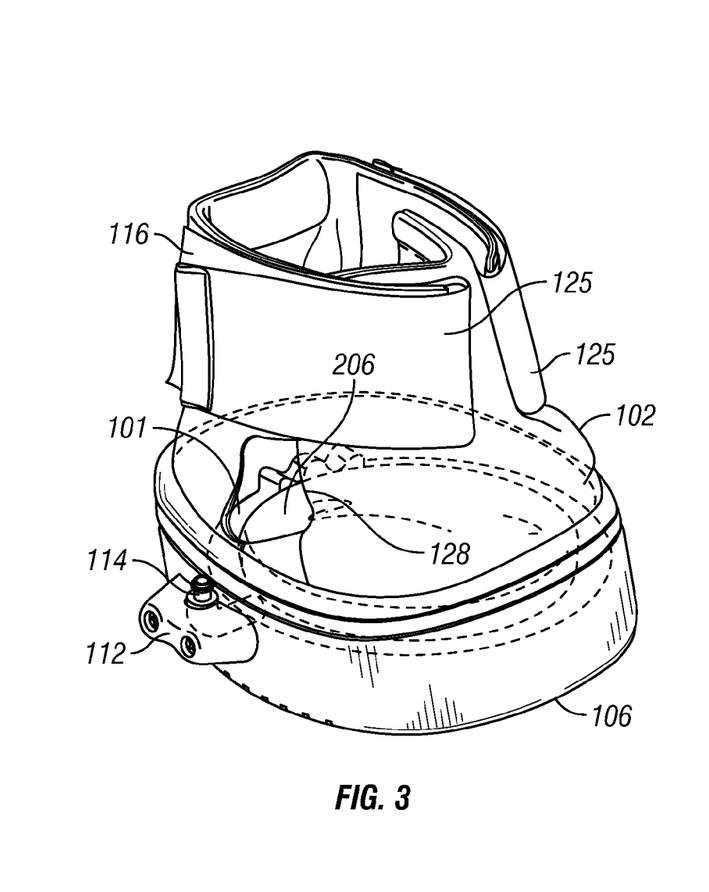
FIG. 3 is an isometric view of a boot showing a pulsing inlet conduit for connection of a pad to a pulsing means.
Figure 4:
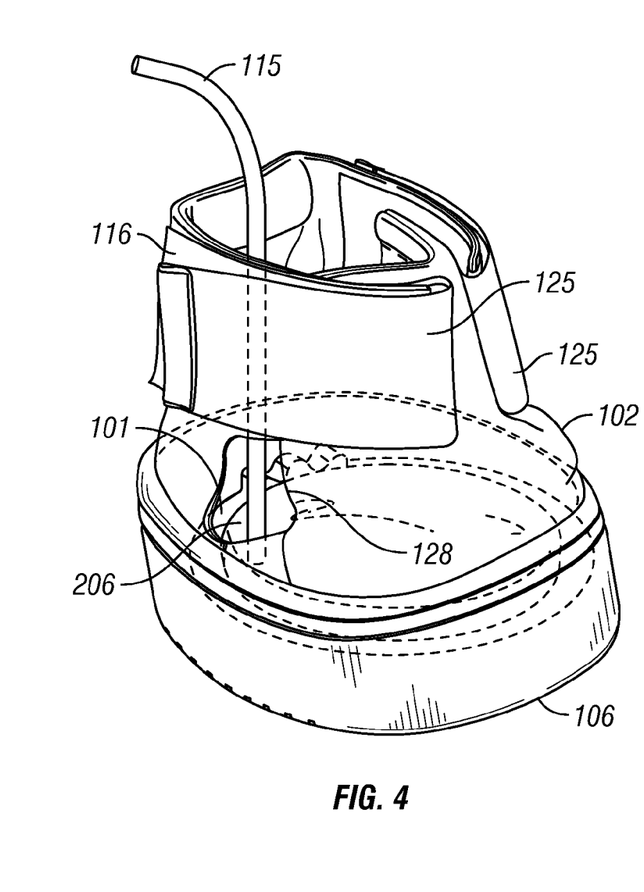
FIG. 4 is an isometric view of a boot showing an alternative means for connection of a pad to a pulsing means.

The boot/pad assembly comprises a flexible boot (such as shown as 106 in FIG. 3) and shock absorbing orthotic pad (such as 204 in FIG. 1 to 5) disposed inside and at the bottom of the boot (as can be seen as 101 in FIGS. 3 and 4). A version of the pad and boot, as described in the patent and patent applications noted above, is adapted to provide a pulsing means disposed upon, under, or as an integral part of the pad (as described below). The term pulsing as used herein means the cyclical expansion and deflation of a device or other means to apply cyclical surface pressure against some portion(s) of the underside of the hoof of a horse.

The Boot

In broad aspect, the boot of some embodiments of the invention comprises an upper portion made from flexible material (102 of FIGS. 3 and 4), shaped to fit the hoof of an animal. See FIG. 3, 4 and the patents and applications noted above (relevant disclosures of which are incorporated herein by reference). In general, a suitable boot has a front, sides, rear and bottom; the front slopes back and upward, the sides are lower than the front and rear so that when the front and rear are pulled together there is an opening in the sides. There is a fastening means (125 and 116 of FIG. 3) at the top front and rear to fasten the front and rear together around the leg and hoof of a horse. In one aspect, the bottom is attached to a base (106 of FIG. 3) comprising a molded elastomeric base that is preferably entirely circumscribed by a peripheral wall (or sides) defining a receiving area sized to fit over (or under) the bottom of the upper portion.

The base (106 of FIG. 3) is preferably a separate molded piece and is attached to the bottom of the fabric upper. The base helps to hold the boot in position on the hoof and, if walled around the entire circumference, prevents the hoof from sliding forward or rearward while in use. Moreover, the base is important in order to confine the orthotic pad in place and to prevent lateral expansion of the pad. If a relatively "soft" pad is used (as is often desirable), the weight of the horse will flatten the pad and, if there is an opening in the base, the pad will be extruded out the opening. In this case, it is especially important that the bottom circumference of the boot be sufficiently strong to contain the soft pad when it is squeezed outward by the pressure of the horse's hoof. By having the base wall entirely surrounding the circumference, the pad is held in place and will conform to the shape of the hoof, and will continue to do so as the horse moves. This provides an accommodative surface to allow the horse to find the best natural balance position—similar to the effect of having the horse stand in loose sand.

The circumferential wall is especially beneficial, even essential, to confine the pulsing pad, since without the wall preventing lateral expansion, the bladder or pulsing pad would laterally expand and defeat the pulsing action on the sole and frog of the hoof. This accommodative surface, combined with the pulsing action described below, provides an exceptionally effective simulated exercise and therapeutic device and method. The ability to achieve natural balance is especially important for horses with injured or diseased hooves. In horses with severe laminitis, the coffin bone (PIII) is pulled downward by the deep digital flexor tendon to such an extent that cutting the tendon (tenotemy) is often prescribed. The deep gel orthotic (pad) of the present invention allows the horse to adjust its stance to relieve this tendon pull, thereby reducing the pain and promoting healing. The deep gel orthotic, combined with the pulling action, can exercise the tendon, stretching it to the extent that the need for tenotemy is reduced or eliminated. Moreover, tenotemies cause the tendon to re-grow somewhat shorter than it was originally (due to scar tissue, etc.). If a tenotemy is required, the pulsing action of this invention is helpful in stretching and releasing the shortened tendon to promote restoration of the tendon's length and flexibility.

The boot, as described, has a solid bottom (106 of FIGS. 3 and 4) that prevents the hoof from being in direct contact with the ground. This keeps the hooves cleaner and helps to prevent contamination leading to infection and/or injury.

In a preferred embodiment, the bottom of the base (as illustrated by the cross section of the base (106 of FIGS. 3 and 4) is sloped upward in the front at an angle of about five (5) to thirty (30) degrees from the bottom plane. The slope begins at a point on the bottom of the base twenty (20) to forty (40) percent of the length from front to rear of the base plate. The point of beginning is preferably about one third (⅓) of the distance from the front of the length of the base. This angled base plate allows the hoof to rock forward and backward without undue pressure on the hoof. When the horse walks, the boot will naturally "break-over" (i.e. pivot forward), preventing abnormal pressure on the hoof.

Figure 7:
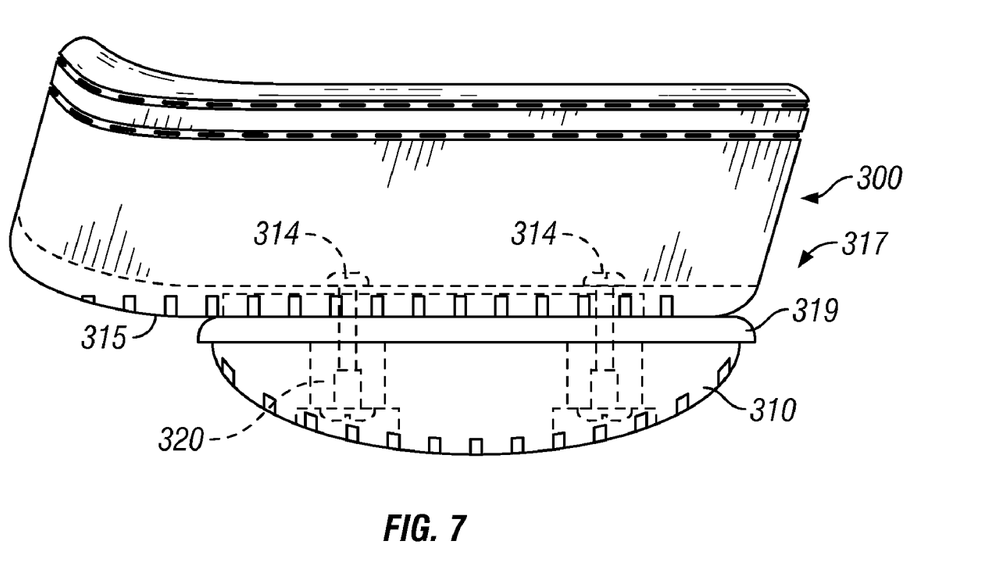
FIG. 7 is an illustration of a boot sole plate with a rocker attachment.

This rocker effect is well recognized as beneficial, and there are a number of commercial products—such as the "clog" shoe, and other devices designed to "rock" with the shift in body weight of the horse—allowing the hoof to achieve a "natural balance." This is especially helpful for horses with sore or damaged hooves. This type of tapered base is more fully described in U.S. Pat. No. 7,445,051, issued Nov. 4, 2008, D565,256, issued Mar. 25, 2008, patent application Ser. No. 12/284,925 filed Sep. 24, 2008, all of which appropriate portions are incorporated herein by reference. An additional "rocker" attachment as shown in FIG. 7 may also be used and is more fully described below.

The base plate is preferably molded of polymeric elastomer material or hard rubber (having the consistency and hardness to approximate automobile tires). Thermoplastic polyurethanes (TPUs) are suitable materials for the base plate. It is preferred that thermoplastic polyurethanes of about fifty-five (55) to seventy-five (75) Shore A hardness be used, with Shore A hardness of sixty-five (65) to seventy (70) being especially suitable. Other polymer materials with characteristics similar to thermoplastic polyurethanes may also be suitable. Choosing these will be well within the ability of those skilled in the polymer art.

The Pad

The base of the shock absorbing orthotic pad (204 in FIGS. 1 and 2, and shown and described in the referenced patents and applications noted above) the relevant portions of which are incorporated herein by reference, is generally shaped to both approximate the shape of the animal's hoof-print and fit into the boot. This pad, preferably made of shock absorbing material, can be easily trimmed to conform to the hoof of the individual animal on which it will be used. More elongated oval shapes are especially useful in laminitis affected horses, where the hoof is tilted downward because of the abnormal growth rates of the hoof walls caused by the compromised tubules of the laminae.

It is well known that the hoof frog acts somewhat as a blood pump. See for example, U.S. Pat. No. 4,981,010 where it is stated "The horny frog (58) is very elastic and acts as a shock absorber and as a second heart to the horse. As the hoof is pressed against the ground, old blood is forced up and out of the foot. When the hoof is lifted off the ground, the elastic frog (58) springs back, letting new blood into the foot." With the pulsing means of this invention, the frog will be massaged and flexed, even if the horse is shod. Without the pulsing means, the shoe holds the hoof sole off the ground, reducing the natural action of flexing the frog and resulting in decreased blood flow. The pulsing action of this invention allows the natural rhythmic application of pressure to the frog to continue even on shod horses.

Figure 1:
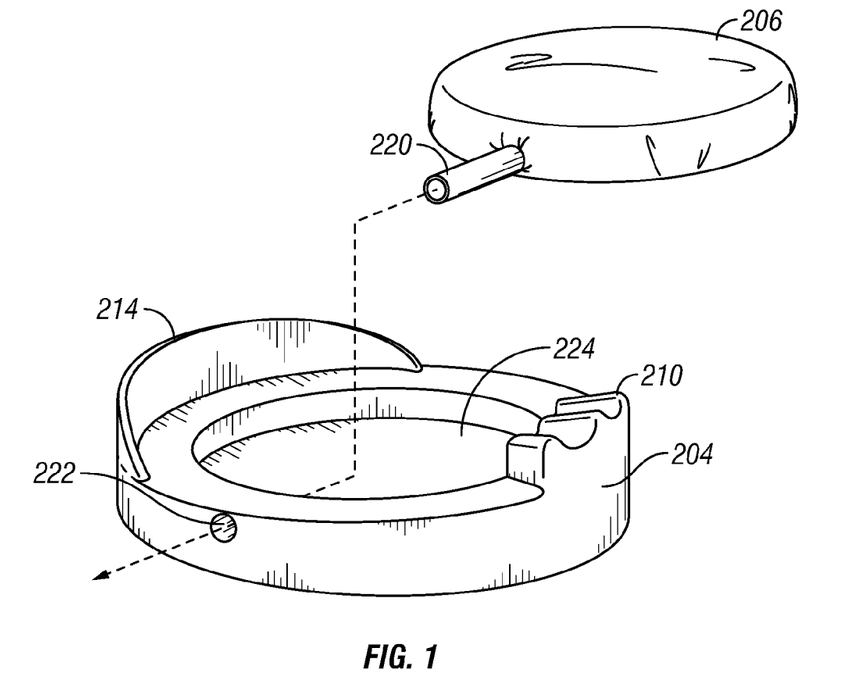
FIG. 1 is an isometric view of a pad and pressure bag of an embodiment of the invention.

In one embodiment, on the backside of the base, opposite the ridge, is a truncated frog support (210 in FIGS. 1 and 2). This is a triangular projection above the surface of the base. This triangular projection is designed to approximately correspond to the shape and location of the frog of a horse's hoof and contact the frog during use, providing a kind of massage to the frog of the hoof. Thus, blood circulation is stimulated and stress on the animal's legs and tendons is relieved. It is the pumping action of the frog that makes the pulsing of the underside of the hoof especially effective. The front support (214 in FIGS. 1 and 2) provides cushioning for the toe of the hoof.

In some embodiments, the pad (204 in FIGS. 1 and 2) will not have the triangular projection (210 in FIGS. 1 and 2) or the front projection, (214 in FIGS. 1 and 2). When used with a horse that has an abscessed or injured frog, it may be desirable to use a pad without the frog support. Also, the improved base of the boot makes it possible to eliminate the front projection for some applications. However, even without the frog support, the front ridge projection (214 in FIGS. 1 and 2) is often useful, especially for a horse with a severely injured or damaged hoof. At times it is necessary to resection (remove the front hard hoof surface) a horse's hoof if it is damaged or diseased. Such is the case with advanced laminitis. In these cases, the soft front support ridge provides extra comfort to the hoof, especially if the pad is wedge-shaped (sloped) in a way that forces the front of the hoof downward.

The pad base bears the burden of supplying the bulk of the support for the animal. The frog support is an aid to stimulation of the frog and is not the principal means of supporting the hoof. In this way, the present invention differs from previous frog support shoes or pads that allow the hoof wall to move. An advantage of the relatively large and soft pad (Deep Gel™) is that it enables the horse to adjust the position of its hoof to the most comfortable position. Support of the rear of the hoof reduces the pull of the deep flexor tendon on the coffin bone in tendinitis, and serves to reduce pain and provide support for healing of the lamina.

Likewise, it has been found that the shape of the pad is important. Completely round pads have been found not to perform well in actual use, as they tend to rotate in the boot. An elliptically shaped pad is desirable to maintain consistent fit and to prevent rotation of the pad in use. The shape will depend on the nature of the hooves, for example, Arabian horses generally have more elongated hooves than do Quarter horses. Moreover, more elongated pads are more suited for horses with laminitis, as is discussed above.

The base of the pad can be made of any suitable elastomeric polymer material that provides flexibility, shock absorbency, some degree of elasticity, resilience, and dimensional stability. Polyvinyl chloride (PVC), polysilicone, and similar elastomers, well known to those in the art, are also suitable. In a preferred embodiment, the base is constructed of a cast polyurethane elastomer. For example, polyurethane casting elastomer having a Shore A hardness of from about ten (10) to about seventy (70) is suitable. It is preferred that the base be of about twenty (20) to seventy (70) Shore A hardness and the support be of about eight (8) to fifty (50) Shore A hardness. In some situations, very soft pads are desirable. These will generally be thicker than harder pads, and will have a Shore 00 hardness of about five (5) to seventy (70).

It is preferred that the material for the pads of this invention have low rebound resiliency, generally lower that twenty-five (25) percent and preferably between two (2) and ten (10) percent.

These elastomeric pads are sometimes referred to herein as "gel" or "gel pads" and as "orthotics".

FIGS. 1 and 2 illustrate a pad of an embodiment of the invention in which there is a depression (224 in FIGS. 1 and 2) in the pad to receive a pressure pulsing container 206. The top sides of the pad, when in use, are disposed under the outer edge of the hoof and give support to the hoof. The pressure pulsing container 206 will also give some support to the center of the hoof. In another embodiment there will be both an inlet and outlet port in the pad, useful when the pressuring fluid is liquid that will not be vented but circulated.

Figure 5:
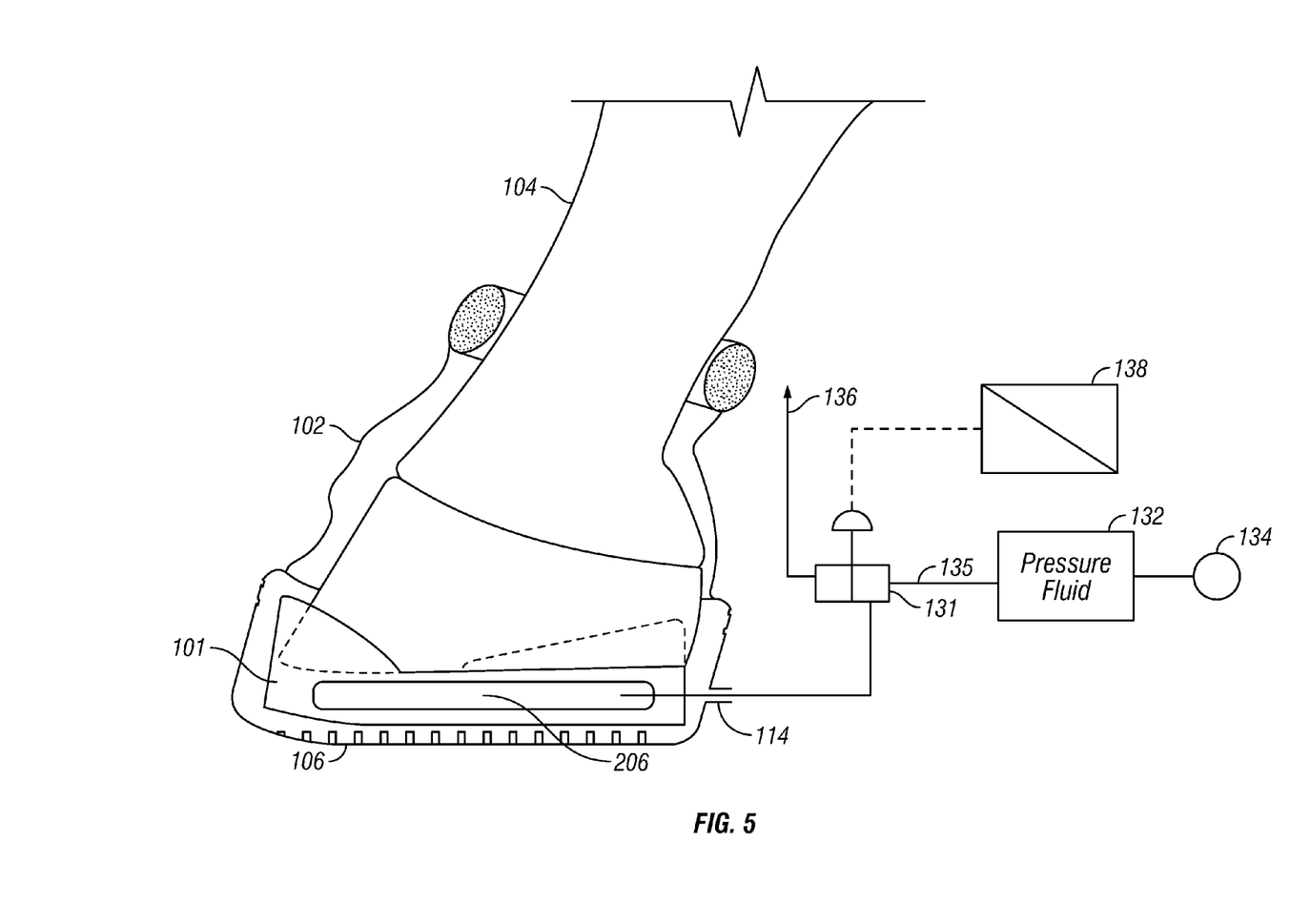
FIG. 5 is a schematic representation of an equine leg inside a boot of the invention showing a pulsing bladder (bag), a pulsing monitor and valves for a single hoof.
Figure 6:
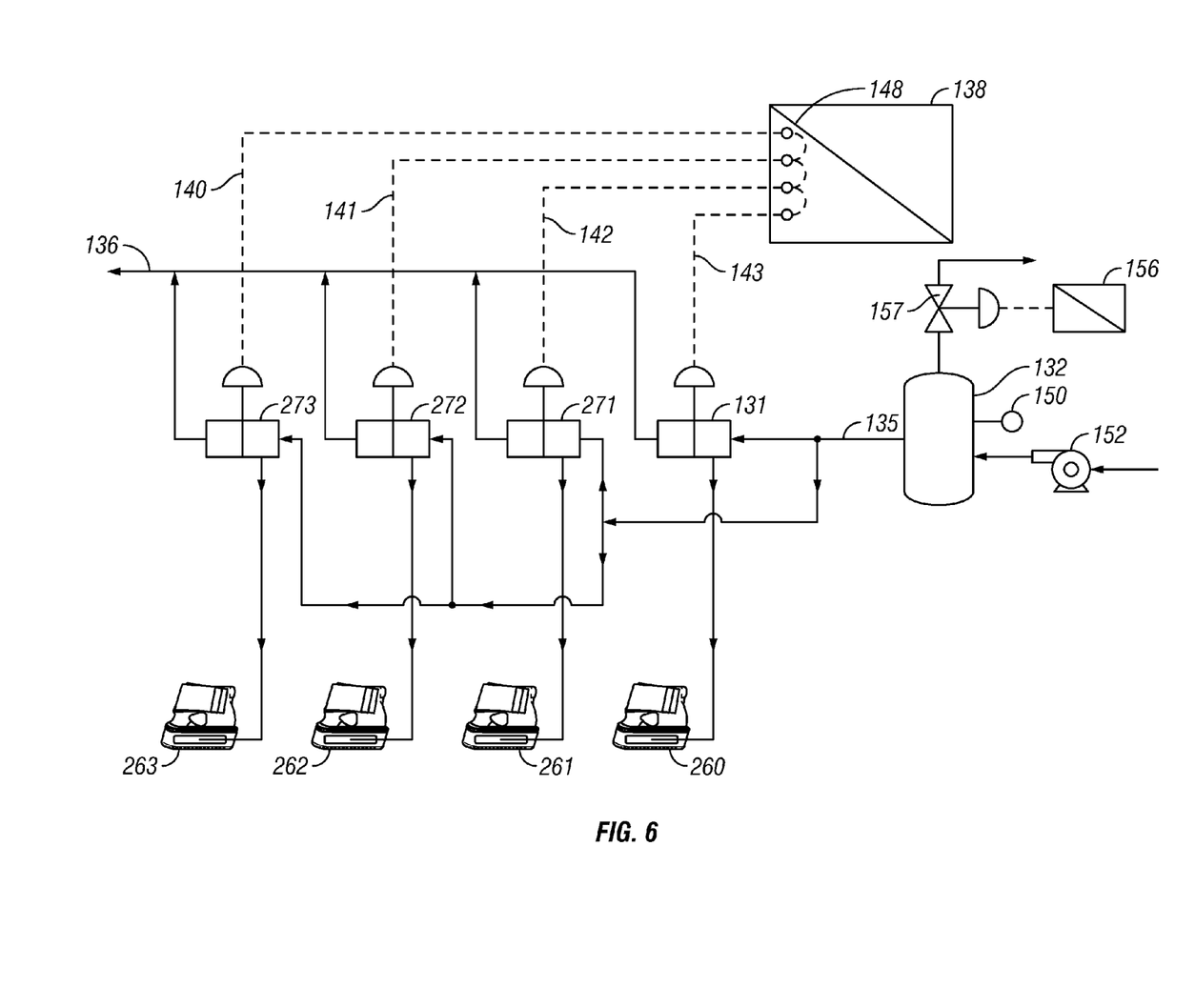
FIG. 6 is a schematic diagram of an embodiment of a control system of the pulsing means, with a pressure source, monitor and valving for four hooves.

A two port bladder with two ports is shown in FIGS. 5, 6 and 7 of application Ser. No. 12/581,620 filed Oct. 19, 2009, Publication No. US 2010-0095614, the disclosure and teachings of which are incorporated herein by reference.

In another embodiment, the underside of the pad has a depression (rather than the top side) similar to that shown in FIGS. 1 and 2 into which is fitted a pressure pulsing container as described above. Thus, when cyclically inflated and deflated, the pad provides a massaging action to the bottom of the hoof. The bladder (206 in FIGS. 1 and 2) has an inlet port 220. Inlet and outlet ports could be provided for use if the pressurizing fluid is liquid.

The depression (224 in FIG. 1) in pad 204 has a minimum depth of approximately six and four-tenths (6.4) mm (0.25 inch) from the surface of the pad, and is generally centered in the pad so as to leave at least about twelve and seven-tenths (12.7) mm (0.5 inch) of pad surface around the depression. This pad surface space is to provide support of the equine hoof and may be as wide (from depression to the outside edge of the pad) as thirty-eight (38) mm (1.5 inches), depending upon the size of the pad (to accommodate different size hooves) and the desired support surface for the hoof.

In general, it is desirable to have the pulsing means built in as an integral part of a gel orthotic pad. As explained above, placing the pulsing means into the pad provides the most flexibility for size, placement, and location to customize the pulsing means and action.

As shown in FIGS. 1 and 2, the pad has a hole (222 in FIG. 1) in the side for fluid conduit(s) 220 to pass through. Instead of holes, cuts may be made in the side of the pad to accommodate the conduit. Alternatively, the conduit may be extended or connected to longer conduits which are not passed through the side of the boot (see boots in U.S. Pat. No. 7,445,051, issued Nov. 4, 2008, D565256, issued Mar. 25, 2008), but are placed along the inside of the boot (between the boot and hoof) and passed out the side opening or top of the boot to be connected to conduits as shown by 115 in FIG. 4. The range of suitable densities and construction materials for the pad 204 is basically the same as detailed above. As explained above, the front ridge and frog support are useful, but are not essential to the invention. The pressure pulsing means is sized to fit within the pad's depression and is constructed of a flexible polymer material capable of withstanding the pressure of the weight of a horse's hoof—it needs to be reasonably tough and durable. Elastomeric polymers include Teflon™, Ultra High Molecular Weight (UHMW) polyethylene, some polyurethanes, and the like. Choosing a suitably tough polymeric material is well within the skill of one skilled in the art of practicing this invention.

In a test, a pressure bag, about fifteen (15) by fourteen (14) cm (6 by 5.5 inches), with a single conduit port, was attached to a squeeze bulb with a pressure gage and was placed completely under an orthotic pad such as that described above (without a special depression) and placed on one hoof of a horse. When pressured to about ninety-seven (97) kPa (14 psig), the hoof was lifted about two and one-half (2.5) cm (1 inch). When the horse shifted its weight, the pressure dropped to about fourteen (14) kPa (2 psi). This test demonstrates that high pressures are not needed, and that a pressure in the range of about near zero to about two hundred seven (207) kPa (0+ to 30 psi) is effective to achieve the purposes of this invention.

Pressures of about thirty-four (34) to one hundred thirty-eight (138) kPa (5-20 psig) are preferred, and pressures of about eighty-three (83) to one hundred twenty-four (124) kPa (12-18 psig) are suitable for most applications. In one embodiment, a conduit is attached to the pulsing means (pressure bladder or bag) and passed through the side of the boot (see 112, 114 and 115 of FIG. 4). FIG. 3 shows an angled quick-connect fitting 114 on the side of a boot, held by rubber bumper 112. In FIG. 4 is shown an alternative configuration where conduit 115 passes through hole in the side of the boot to connect the pressure bladder to a pressuring means. In both cases there may be both inlet and outlet port and conduits.

FIG. 5 shows conduit 135 leading from the pressure source 132 through a three way valve 131 is attached to the pressuring bladder 206. The pressure source, 132, may be a pressure pump, air compressor, a vessel held at constant pressure or the like. Only one hoof system is shown but generally there will be a system for each of the four hooves as shown in FIG. 6.

In general, to the simplest system of the invention will use air as the pressure fluid and to use only one conduit. Air passes to the pulsing means by the single port to pressure the pulsing means. When pressure is released by venting through conduit 136 when the pressurized fluid is closed off, the pulsing means deflates. The pressure is simply vented or directed to pressure another hoof pulsing means. The air or other fluid may also be circulate by conduit to the pressure source, as to the inlet of a compressor. The single port pulsing means and use of compressed air is the simplest embodiment of the invention and works effectively.

FIG. 6 illustrates a system of the invention for connection to and control of pulsing means on all four hooves of a horse—the preferred and most useful configuration for the invention. In FIG. 6 there is a pressure source 132 with a pressure gage 150 and pump or compressor 152 to maintain constant pressure in the source 132. Valve 157 will release excess pressure. The valve is controlled by controller 156. Pressured air, gas or liquid is passed to three way control valves 131, 271, 272 and 273 through conduit 135. The controller 138 controls the valves in a fixed or adjustable sequence to simulate the desired gait of a horse. Pressure fluid passes to boot bladders 260, 261,262 and 263 to inflate and deflate the bladders. The fluid may be vented via conduit 136 or, alternatively, may be recycled to the pressure source, as through the inlet to pump 152. Also, if the bladders have two ports (as described above) the fluid may be returned from the bladder to the pressure source. In one embodiment the pressure fluid will be coolant that is maintained at a low temperature. The coolant fluid will be circulated through the bladder, and perhaps cooling tubes around the legs to lower the blood temperature. Details of such a hoof and leg cooling system are described in patent application Ser. No. 12/581,620, filed Oct. 19, 2009, Publication No. US 2010-0095641, the description incorporated here by reference.

In another embodiment, illustrated in FIG. 7 the sole base is fitted with a "rocker" attachment to provide more flexibility in breaker range and position. As shown in FIG. 7 the rocker attachment is rounded front and rear. It may also be more rounded in front and less tapered in the rear. A number of suitable configurations will work and tailored to the particular needs of the horse on which the boots are placed. In FIG. 7 the boot base 300 has a spacer 319 that is patterned matched to the pattern of the underside of boot base 300. Rocker 310 is attached to the spacer 319 by screw bolts 315. The rocker 310 has slots 310 to allow the rocker to be moved toward the front or rear of the boot base to micro-adjust the position of the rocker relative to the boot base, thus allowing adjustment of the "breakover" point.

A fuller description of rocker attachments suitable for this invention is described in patent application Ser. No. 12/882,352, filed Sep. 15, 2010, U.S. Publication No. 2011/0067366 A1, the disclosure and teachings of which are incorporated herein by reference.

Rocker Attachment as the term is used herein means the attachment described in FIG. 7 and those described in application Ser. No. 12/882,352 and those obvious variations as will be evident to those skilled in the art.

A small, portable, battery powered pressure pump, together with suitable valves and control means, can be entirely mounted on a horse, giving complete freedom of movement. For example, the entire pumping means, valves and control panel may be attached to a surcingle or overgirth (see http://en.wikipedia.org/wiki/Surcingle).

This arrangement allows very simple adaptation of a "standard" Soft-Ride™ boot assembly (boot assembly described in U.S. Pat. No. 7,445,051, issued Nov. 4, 2008 and D565256, issued Mar. 25, 2008). The pulsing means is simply placed under or on top of the gel orthotic pad, or the gel orthotic pad is replaced with an orthotic with integral pulsing means, and the conduit is then passed out the side opening of the boot. Thus, purchase of a new boot is not required.

For use in trailers, the portable battery may be bypassed and the pressure means (pump or compressor) attached to an electrical connection on the vehicle or trailer. Such 12 volt outlets are often provided on horse trailers. The same made be done in stalls equipped with DC power outlets, or with batteries external to the mounted battery assembly.

Operation of the Walker Simulator of the Invention

In operation, boots is fitted with a pad (204 in FIGS. 1, 2, 3 and 4), having a pressure pulsing means or source as illustrate in FIGS. 5 and 6. and placed on the horse. FIGS. 5 and 6 shows a conduit 135 connected to the pulsing means and running from a pressure source or tank 132. A three-way valve 131 is controlled by controller 138, which directs the pressurizing fluid into the pressure pulsing means 206 or out of the system by conduit 136. If the fluid is air or other gas, it may be simply vented into the air or directed to another hoof pulsing means. If it is a recoverable fluid, it may be directed to a storage vessel to be transferred back into pressure vessel 132.

In operation, the controller, 138, allows pressurizing fluid into pressure pulsing means 206 through control valve 131 to inflate the pulsing means. To deflate, the controller closes the pad conduit side of the valve and opens the vent 136 side, thus, allowing the pad to deflate. The inflation and deflation of pressure pulsing means 206 provides a pulsing action on the bottom of the hoof similar to walking or running. When pressurized, the container applies surface pressure against the underside of the hoof, which is relieved when the container is depressurized. The pulsing action is very like the natural mechanical action on the hoof of the animal when walking, trotting or running. Pressuring and release is automated, as shown in FIGS. 5 and 6, by a suitable control means, 138, the design and construction of which is well within the ability of those skilled in the electronic control arts. Such control will ideally allow the timing and sequence of the pulsing to be easily adjusted. The controller 138 optionally, has suitable indicators, 148, to indicate the position of the control valves. Indicators may be lights or alarms, preferable led lights. The pressure reservoir will suitably have a pressure gage 134 or 150 and means to maintain pressure, such as a compressor or pump, to maintain pressure in pressure source 132. If the pressure means is a pump directly connected to conduit 135 the reservoir 132 may be an open vessel to hold the liquid fluid.

In the preferred configuration, the pulsing action is provided for all four hooves and is coordinated between the hooves; thus, on the front hooves, one hoof pressure pulsing means is inflated while the other hoof pressure pulsing means is deflated, then the action is switched. This is schematically illustrated in FIG. 6. The pressurizing arrangement of FIG. 5 is duplicated for each hoof boot or is modified with multiple inlet and outlet valves as detailed above. The arrangement allows variation in pressure (lift) and timing intervals. Pulsation of the rear hooves can be similarly coordinated with each other and with pulsation of the front hooves, in order to simulate the rhythmic pattern of equine gaits, such as walking, trotting or running. FIG. 6 shows a schematic of the four hoof system. Pressurization fluid passes through conduit 135 to each of the three way valves: 273, 272, 271, and 131. When deflated, the air is vented through conduit 136 or recycled as explained above. These valves are controlled by signals from controller 138 through signal leads 140, 141, 142, and 143. Items 148 are optional signal lights (e.g. LEDs) to indicate activity. In one embodiment, the pressure in tank 132 is controlled by controller 156 and pump 152. Controller 156 activates pump 152 to add pressure, or opens valve 158 to release pressure. Tank 132 also has optional pressure gage 150. A pulsing sequence of about 0.5 to 6 seconds will approximate walking, with a sequence of about 1 to 3 seconds being preferred. Generally, at a walk, three hooves will be on the ground and one off the ground, as explained below. In that case, in FIG. 6 three hoof bladders will be inflated while one will be deflated, and inflation and deflation will be appropriately sequenced. For example, the bladder in boot 260 may be deflated, simulating boot 260 off the ground, and boots 261, 262, and 263 will be inflated, simulating contact with the ground.

The pulsing sequence, timing, and degree of inflation can be customized by the user to find an optimum, and can be varied to adjust the routine to obtain additional benefits. The timing to simulate any condition of walking, or other gaits, can be easily discerned and the operation of the pulsing boot assemblies (pulse timing, hoof sequencing, etc.) set to obtain appropriate simulation of these natural gait conditions. A walking gait is preferred. For example, it is known that "The walk is a four-beat gait that averages about 4 miles per hour (6.4 km/h). When walking, a horse's legs follow this sequence: left hind leg left front leg, right hind leg, right front leg, in a regular 1-2-3-4 beat. At the walk, the horse will always have one foot raised and the other three feet on the ground, save for a brief moment when weight is being transferred from one foot to another." http://en.wikipedia.org/wiki/Horse gaits.

Thus, at a walk, three of the hoof pads will be inflated, simulating hooves on the ground, and one will be deflated, simulating the hoof that is raised. Then the deflated hoof pad will be inflated, simulating the hoof being placed on the ground and another hoof pad will be deflated, in the sequence described above. For gaits other than a walk, the timing, sequence, number of hooves on the ground, and pressure applied may vary. This can easily be simulated by reference to the description of the gaits as in the reference above. Timing of the pulse will be longer if simulating a walk than it will be for faster gaits and the sequence will be different.

While the invention has been particularly shown and described as referenced to the embodiments thereof, those skilled in the art will understand that the foregoing and other changes in form and detail may be made therein without departing from the spirit and scope of the invention.

The invention claimed is:

1. An equine boot assembly comprising a boot having a flexible upper section and a base, a removable elastomeric shock absorbing pad disposed inside the boot and having a pressure pulsing means disposed under or within the shock absorbing pad.

2. The assembly of claim 1 wherein the shock absorbing pad is elastomeric and has the pressure pulsing means molded as an integral part of the elastomeric shock absorbing pad.

3. The assembly of claim 1 wherein the boot base has a wall extending upward around its entire circumference attached to the flexible upper section, the pressure pulsing means is a flexible bladder into which fluid may be injected and released to inflate and deflate the bladder.

4. The boot assembly of claim 1 wherein the pressure pulsing means is connected to a pressure source for inflating the pulsing means and a pressure relief means to release pressure and thereby deflate the pulsing means.

5. The assembly of claim 3 wherein the fluid is a coolant.

6. The assembly of claim 2 wherein the base of the boot is fitted with a rocker attachment.

7. The boot assembly of claim 1 wherein the boot comprises an upper section made from flexible material, shaped to fit around a hoof of a horse, comprising a front, sides, and a rear, a fastening means to fasten the front and rear together around an equine leg, and a base having a wall extending upward around its entire circumference attached to the flexible upper section; the pad is an elastomeric shock absorbing pad disposed inside the boot having disposed therein or thereunder a pressure pulsing means, which in turn is connected both to a pumping means to transport fluid into the pressure pulsing means to inflate it and a pressure relief means to allow the pulsing means to deflate.

8. The assembly of claim 1 wherein the shock absorbing pad has a top surface, a bottom surface and edges and wherein there is a triangular upward projection on the top surface of said pad sized and positioned to engage a frog of an equine hoof when the assembly is placed on a hoof of an equine.

9. An equine boot assembly comprising a boot having a flexible upper section and a base having a wall extending upward around its entire circumference attached to the flexible upper section, an elastomeric shock absorbing pad having a top surface, a bottom surface and edges and a depression in the top surface into which a flexible bladder is disposed, said shock absorbing pad being disposed inside the boot.

10. The boot assembly of claim 9 wherein the depression extends at least six and four-tenths (6.4) millimeters (0.25 inch) below the top surface of the pad and a peripheral edge of the depression no closer to the edges of the pad than about twelve and seven-tenths (12.7) millimeters (0.5 inch).

11. A method of simulating movement of an equine animal comprising placing at least one of its hooves inside a boot assembly comprising a boot, a removable elastomeric shock absorbing pad disposed inside the boot and having a pressure pulsing means disposed under or within the shock absorbing pad and passing a fluid into and out of the pressure pulsing means to expand and deflate said pressure pulsing means.

12. The method of claim 11 wherein a means of passing fluid is utilized that comprises a fluid pump, inlet valves to force fluid to pass by conduit to each of multiple boots assemblies having pulsing means to inflate the pressure pulsing means and outlet valves to allow the fluid to flow to a reservoir, thus deflating the pressure pulsing means.

13. The method of claim 11 wherein the pump and relief means are automated, with a controller to provide timing and sequencing of inflation and deflation of the pressure pulsing means of multiple pulsing boot assemblies to simulate gaits of an equine animal.

14. The method of claim 11 wherein the shock absorbing pad has a top surface, a bottom surface and a rim and has a depression in the top surface with the pressure pulsing means disposed in the depression, which pressure pulsing means is alternatively expanded and deflated by injection and then release of fluid.

15. The method of claim 11 wherein the shock absorbing pad has a top surface, a bottom surface and a rim and has a depression in the bottom surface with the pressure pulsing means disposed therein, which means is alternatively expanded and deflated by injection and then release of the fluid.

16. The method of claim 11 wherein the fluid is a gas and the pressure pulsing means is inflated and deflated by allowing the gas to enter and exit through a single inlet.

17. The method of claim 13 wherein a gas is passed into and vented from the pressure pulsing means through a multifunction valve or valves, and controlled by an electronic controller.

18. The method of claim 11 wherein the fluid is a cooled coolant.

19. The method of claim 11 wherein the base of the boot is fitted with a rocker attachment.

20. The method of claim 1 wherein the shock absorbing pad has a top surface, a bottom surface and edges and wherein there is a triangular upward projection on the top surface of said pad sized and positioned to engage a frog of an equine hoof when the assembly is placed on a hoof of an equine.

* * * * *